United States Patent
Ando et al.

(10) Patent No.: US 9,772,236 B2
(45) Date of Patent: Sep. 26, 2017

(54) DISPLACEMENT DETECTION DEVICE AND DISPLACEMENT DETECTION METHOD

(71) Applicant: MURATA MANUFACTURING CO., LTD., Nagaokakyo-shi, Kyoto-fu (JP)

(72) Inventors: Masamichi Ando, Nagaokakyo (JP); Hideki Kawamura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 430 days.

(21) Appl. No.: 14/261,862

(22) Filed: Apr. 25, 2014

(65) Prior Publication Data

US 2014/0230573 A1 Aug. 21, 2014

Related U.S. Application Data

(63) Continuation of application No. PCT/JP2012/077417, filed on Oct. 24, 2012.

(30) Foreign Application Priority Data

Oct. 28, 2011 (JP) .................................. 2011-237677

(51) Int. Cl.
*G01L 1/00* (2006.01)
*G01L 1/16* (2006.01)
(Continued)

(52) U.S. Cl.
CPC .................. *G01L 1/16* (2013.01); *G01B 7/16* (2013.01); *G01B 7/22* (2013.01); *G01L 1/25* (2013.01); *G01L 9/008* (2013.01); *G01L 9/08* (2013.01)

(58) Field of Classification Search
CPC ... G01L 1/16; G01L 1/225; G01L 9/08; G01L 9/008; G01B 7/16; G01B 7/22
(Continued)

(56) References Cited

U.S. PATENT DOCUMENTS 4,009,447 A * 2/1977 Wolf .......................... G01L 1/16
310/314
4,807,482 A 2/1989 Park et al.
(Continued)

FOREIGN PATENT DOCUMENTS

EP 2290719 A1 3/2011
JP 2006-038710 A 2/2006
WO WO-2009-139237 A1 11/2009

OTHER PUBLICATIONS

Written Opinion and International Search Report issued in PCT/JP2012/077417 mailed on Dec. 11, 2012.

*Primary Examiner* — Jonathan Dunlap
(74) *Attorney, Agent, or Firm* — Arent Fox LLP

(57) ABSTRACT

A displacement detection device includes a piezoelectric sensor. The piezoelectric sensor is provided with a piezoelectric sheet on both principal surfaces of which detection electrodes are formed. When stress is applied to the piezoelectric sensor, charge is generated, and an output voltage in accordance with this generated charge is detected in a DC voltage detector. A controller measures this output voltage at a predetermined time interval. Every time the controller measures the output voltage, the controller makes a short-circuit control of a switch, and causes the charge generated in the piezoelectric sensor to be released. The controller can thereby detect an amount of change in output voltage generated at the predetermined time interval in accordance with an amount of displacement of the piezoelectric sensor. By sequentially integrating this, the controller can accurately detect the amount of displacement of the piezoelectric sensor which changes across measurement timings.

19 Claims, 7 Drawing Sheets

(51) Int. Cl.
*G01B 7/16* (2006.01)
*G01L 1/25* (2006.01)
*G01L 9/00* (2006.01)
*G01L 9/08* (2006.01)

(58) Field of Classification Search
USPC ....... 73/777, 862.68; 324/123 C, 123 R, 678
See application file for complete search history.

(56) References Cited

U.S. PATENT DOCUMENTS

| | | | | |
|---|---|---|---|---|
| 5,298,602 A * | 3/1994 | Shikinami | ................. | A61F 2/28 252/62.9 R |
| 5,443,780 A * | 8/1995 | Matsumoto | ........... | B29C 55/005 264/176.1 |
| 5,621,178 A * | 4/1997 | Van Pelt | .................... | G01L 1/08 73/862.381 |
| 6,037,703 A * | 3/2000 | Kambe | ..................... | G01L 1/16 29/25.35 |
| 6,218,898 B1 * | 4/2001 | Zanetti | .................. | G01D 3/036 310/311 |
| 6,466,036 B1 * | 10/2002 | Philipp | .................... | G01D 5/24 324/658 |
| 7,181,977 B2 * | 2/2007 | Thompson | ................ | G01L 1/16 73/777 |
| 7,997,144 B1 | 8/2011 | Pekarek et al. | | |
| 8,132,468 B2 * | 3/2012 | Radivojevic | .............. | G01L 1/16 73/777 |
| 8,183,751 B2 * | 5/2012 | Tajitsu | .................. | H01L 41/193 310/328 |
| 8,508,217 B2 * | 8/2013 | Eguchi | .................. | G01D 18/00 324/102 |
| 8,648,151 B2 * | 2/2014 | Yoshida | ................. | C08G 63/08 252/62.9 R |
| 8,789,426 B1 * | 7/2014 | Pekarek | .................... | G01L 1/16 73/777 |
| 8,829,121 B2 * | 9/2014 | Yoshida | ................. | H01L 41/45 252/62.9 R |
| 8,946,974 B2 * | 2/2015 | Yu | ........................ | D01D 5/0038 252/62.9 PZ |
| 9,048,426 B2 * | 6/2015 | Ando | .................... | H01L 41/193 |
| 9,184,372 B2 * | 11/2015 | Yoshida | ................. | C08L 67/04 |
| 2006/0199659 A1 * | 9/2006 | Caldwell | ............ | A63B 69/3608 473/221 |
| 2010/0308794 A1 * | 12/2010 | Townsend | ................ | G01B 7/16 324/103 P |
| 2011/0109204 A1 | 5/2011 | Tajitsu et al. | | |
| 2012/0108783 A1 * | 5/2012 | Ando | .................... | H01L 41/193 528/272 |
| 2013/0108061 A1 * | 5/2013 | Ando | .................... | G06F 3/0433 381/55 |
| 2014/0049137 A1 * | 2/2014 | Ando | ...................... | G01B 7/16 310/330 |
| 2014/0331791 A1 * | 11/2014 | Ishii | ...................... | G01B 7/003 73/862.625 |

* cited by examiner

DISPLACEMENT DETECTION DEVICE AND DISPLACEMENT DETECTION METHOD

CROSS REFERENCE TO RELATED APPLICATIONS

The present application is a continuation of PCT/JP2012/077417 filed Oct. 24, 2012, which claims priority to Japanese Patent Application No. 2011-237677, filed Oct. 28, 2011, the entire contents of each of which are incorporated herein by reference.

FIELD OF THE INVENTION

The present invention relates to a displacement detection device and a displacement detection method for detecting displacement, such as flexure, of a detection object.

BACKGROUND OF THE INVENTION

As a device for detecting transformation, such as flexure, of a detection object, there has hitherto been one using a piezoelectric substance in Patent Document 1. In this device, a detection electrode is formed on a flat membrane type piezoelectric substance, to configure a flat membrane type piezoelectric sensor. This piezoelectric sensor is stuck to a detection object portion such as an elbow. A voltage outputted from the piezoelectric sensor is detected in accordance with bending of the detection object portion (elbow).

The piezoelectric substance used in such a piezoelectric sensor generates a voltage in accordance with an amount of bending at the moment of application of bending stress.

Patent Document 1: Unexamined Japanese Patent Publication No. 2006-038710

However, in the piezoelectric substance, when a bending state is held constant, charge is attenuated and the voltage turns back to an original state. For example, assuming that a voltage value in a first state as a reference state is Vs[V]. Even when bending stress is applied and a voltage value of $\Delta V_{12}$[V] is generated in a second state, if the second state is held, the voltage value turns back to the voltage value of Vs[V] for the first state. That is, when time elapses while the piezoelectric substance is in the second state where the piezoelectric substance has been bent just in a predetermined amount of bending, the piezoelectric substance is detected with the voltage value Vs[V] for the first state.

When the piezoelectric substance is further displaced into a third state while such a state as above is held, a voltage value of $\Delta V_{23}$[V] is generated, the voltage value corresponding to an amount of displacement from the second state to the third state. However, in this case, a voltage value to be a reference at the time of detecting the third state is Vs[V]. Therefore, the voltage value at the timing of detecting the third state is Vs+$\Delta V_{23}$ [V].

Here, the third state has occurred from the first state via the second state, and the voltage value should normally be Vs+$\Delta V_{12}$+$\Delta V_{23}$ [V].

Hence the detected voltage value does not agree with the actual amount of displacement.

SUMMARY OF THE INVENTION

In view of such a problem, an object of the present invention is to provide a displacement detection device and a displacement detection method which can accurately detect a voltage agreeing with an amount of displacement of a piezoelectric sensor (piezoelectric substance).

This invention relates to a displacement detection device provided with: a piezoelectric sensor including a flat membrane type piezoelectric substance and detection electrodes formed on two opposed faces of the piezoelectric substance; and voltage measuring means for measuring a voltage generated in the detection electrode due to displacement of the piezoelectric substance. This displacement detection device is provided with: a switch for short-circuiting or opening between two of the detection electrodes in the piezoelectric sensor; and control means for controlling short-circuiting or opening of the switch.

While the control means acquires an output voltage of the piezoelectric sensor which is measured by the voltage measuring means, the control means repeats control of opening the switch for detecting the output voltage of the piezoelectric sensor due to displacement of the piezoelectric substance and short-circuiting the switch just for a predetermined period of time immediately after detecting the output voltage of the piezoelectric sensor due to displacement of the piezoelectric substance. Further, the control means calculates an amount of displacement based on an integrated value of amounts of change in output voltage immediately before the short-circuiting.

With this configuration, the output voltage in accordance with the amount of displacement of the piezoelectric sensor can be detected at the predetermined time interval, and the measured voltage is reset at every output timing. Accordingly, the amount of change in output voltage measured at the predetermined time interval accurately depends on the amount of displacement of the piezoelectric sensor at the time interval. For this reason, by calculating the integrated value of the amounts of change, the amount of displacement of the piezoelectric sensor can be calculated.

Further, the control means of the displacement detection device of this invention preferably has the following configuration. The control means includes storage means for storing a storage voltage which is used for calculation of the amount of displacement. The control means integrates the amounts of changes sequentially from an initial value of the output voltage, to update the storage voltage stored in the storage means.

This configuration shows a constitutional example for specifically performing integration of the amounts of change in output voltage. Further, by previously storing the amount of change at the predetermined time interval, calculation of the amount of displacement can also be made offline at a free interval, e.g., in changed integration time.

Further, the control means of the displacement detection device of this invention preferably has the following configuration. The control means causes the displacement detection device to transition to a standby state where calculation of the amount of displacement is not detected upon detection that the storage voltage remains to be the initial value for predetermined time. The control means sets a temporary storage voltage as the initial value and also detects the output voltage upon detection of a different voltage from the initial value in the voltage measuring means. The control means compares the output voltage and the temporary storage voltage while detecting the output voltage for temporary storage time based on a charge release time constant of the piezoelectric sensor, and updates the temporary storage voltage with the output voltage in the case of the output voltage and temporary storage voltage being different from each other, while taking the output voltage as the storage voltage in the case where the output voltage and the temporary storage voltage substantially agree with each other.

With this configuration, the state becomes the standby state during the time when a predetermined output voltage is not obtained, thereby allowing reduction in power consumption.

Further, it is preferable that the displacement detection device of this invention include a capacitor connected in parallel to the piezoelectric sensor.

With this configuration, by providing the capacitor, an attenuation time constant of the output voltage of the piezoelectric sensor decreases, and time for holding the output voltage becomes longer than in the case of not providing the capacitor. Hence processing such as extension of the output voltage measurement interval can be performed, thereby simplifying measurement processing for the output voltage.

Further, in the displacement detection device of this invention, it is preferable that the piezoelectric substance be made of polylactic acid subjected to stretching treatment at least in a uniaxial direction.

With this configuration, it is possible to enhance output-voltage sensitivity to displacement of the piezoelectric sensor.

Further, in the displacement detection device of this invention, it is preferable that the uniaxial direction be substantially ±45° with respect to a direction in which the piezoelectric substance is displaced.

With this configuration, it is possible to further enhance the output-voltage sensitivity to displacement of the piezoelectric sensor.

Further, the displacement detection device of this invention is applicable to an aspect where a length of a first direction in the piezoelectric substance is larger than a length of a second direction which is orthogonal to the length of the first direction, and an angle formed by the first direction and the uniaxial direction is substantially ±45°.

With this configuration, it is possible to obtain with high sensitivity an output voltage in accordance with bending (warping) along a longer direction of the piezoelectric substance.

Further, the displacement detection device of this invention is applicable to an aspect where a length of a first direction in the piezoelectric substance is larger than a length of a second direction which is orthogonal to the length of the first direction, and an angle formed by the first direction and the uniaxial direction is one of substantially 0° and substantially 90°.

With this configuration, it is possible to obtain with high sensitivity an output voltage in accordance with twisting with the longer direction of the piezoelectric substance taken as a central axis.

Further, the displacement detection device of this invention is also applicable to the following configuration. The piezoelectric sensor includes two pairs of the piezoelectric substance and the detection electrode, and also includes a tabular elastic body, each of the pairs being attached to both surfaces of the tabular elastic body. A length of a first direction in the piezoelectric substance of each of the pairs is larger than a length of a second direction which is orthogonal to the length of the first direction. An angle formed by the first direction and the uniaxial direction in the piezoelectric substance of the first pair is substantially ±45°. An angle formed by the first direction and the uniaxial direction in the piezoelectric substance of the second pair is one of substantially 0° and substantially 90°. The voltage measuring means is provided with respect to each of the pairs of the piezoelectric substance and the detection electrode.

With this configuration, it is possible to simultaneously detect the foregoing bending and twisting.

Further, in the displacement detection device of this invention, it is preferable that the tabular elastic body at least include a conductor on the surface thereof, and the conductor also serve as the detection electrode on the tabular elastic body side of each of the two pairs.

With this configuration, it is possible to simplify the constitutional element of the piezoelectric sensor. That is, it is possible to simplify the constitutional element of the displacement detection device.

Further, in the displacement detection device of this invention, it is preferable that the tabular elastic body and the detection electrode be formed of transparent materials.

With this configuration, it is possible to make the piezoelectric sensor transparent.

Further, in the displacement detection device of this invention, the piezoelectric substances may be laminated via the detection electrode.

With this configuration, it is possible to improve the output-voltage sensitivity to displacement.

According to this invention, it is possible to accurately detect a voltage agreeing with an amount of displacement of a piezoelectric substance mounted on a detection body.

DETAILED DESCRIPTION OF THE PREFERRED EMBODIMENTS

Figure 1:
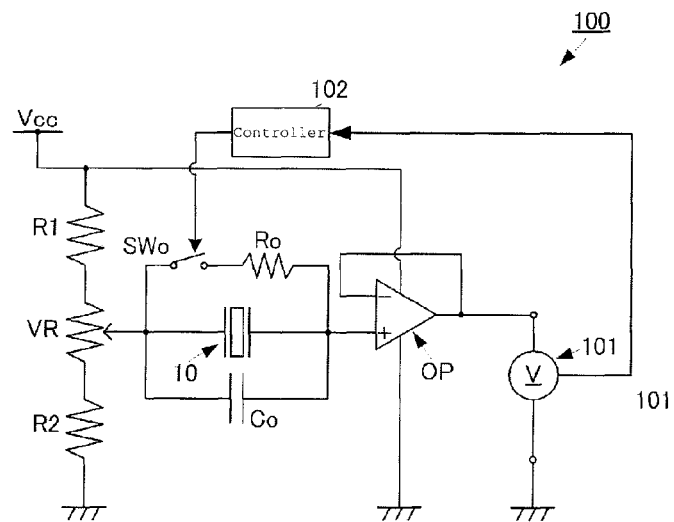
FIG. 1 is a circuit diagram of a displacement detection device 100 according to a first embodiment of the present invention.

A displacement detection device and a displacement detection method according to a first embodiment of the present invention will be described with reference to the drawings. FIG. 1 is a circuit diagram of a displacement detection device 100 according to the first embodiment of the present invention.

The displacement detection device 100 is provided with a piezoelectric sensor 10. A specific structure of the piezoelectric sensor 10 will be described later.

One external connection terminal of the piezoelectric sensor 10 is connected to a variable control terminal of a variable resistor VR. The variable resistor VR is connected between constant resistors R1, R2. An end portion on the constant resistor R1 side of a serial circuit of the constant resistors R1, R2 and the variable resistor VR is applied with a drive voltage Vcc, and an end portion on the constant resistor R2 side is connected to a ground.

The other external connection terminal of the piezoelectric sensor 10 is connected to a non-inverting input terminal of an operational amplifier OP. An output terminal of the operational amplifier OP is connected with a DC voltage detector 101. The output terminal of the operational amplifier OP is feedback-connected to an inverting input terminal of the operational amplifier OP. The operational amplifier OP is also supplied with the drive voltage Vcc.

The piezoelectric sensor 10 is connected in parallel to a serial circuit of a switch SWo and a resistor Ro. On this occasion, at the time when the switch SWo is short-circuited and charge of the piezoelectric sensor 10 is released, the resistor Ro is set to such a voltage value that the charge is released at a high speed (e.g., shorter time than 10 msec) with respect to an output voltage measurement interval.

Further, the piezoelectric sensor 10 is connected in parallel to a capacitor Co. Connecting such a capacitor Co in parallel to the piezoelectric sensor 10 can lower a time constant of voltage reduction of the piezoelectric sensor 10 at the time of the switch SWo being in an open state. Accordingly, compared with the case of not connecting the capacitor Co in parallel, time for holding the output voltage can be made longer and the output voltage can be more reliably detected. Further, the measurement time interval for the output voltage can be made longer, and the output voltage measuring processing can be more simplified.

In addition, due to a highly large input impedance of the operational amplifier OP, the operational amplifier OP can reduce the time constant of voltage reduction without using the capacitor Co. Hence it is also possible to omit the capacitor Co.

A controller 102 measures an output voltage of the DC voltage detector 101 at a predetermined time interval. The measurement time interval may be set as appropriate in view of a specification required for the displacement detection device 100, a time constant of charge release, or the like, and for example, it may be set to the units of 10 msec or 100 msec.

The controller 102 repeats opening control and short-circuiting control of the switch SWo in accordance with the measurement time interval. Specifically, the controller 102 regularly makes opening control of the switch SWo, and makes short-circuiting control of the switch SWo just for predetermined time immediately after measuring the output voltage of the DC voltage detector 101 at the predetermined time interval. This short-circuiting time is set as time when the charge generated in the piezoelectric sensor 10 can be released, and may be decided with reference to a discharge time constant which is decided in accordance with the foregoing voltage value of the resistor Ro, a capacitance of the piezoelectric sensor 10, or the like. It is thereby possible to periodically release the charge generated in the piezoelectric sensor 10 from the piezoelectric sensor 10 at the predetermined time interval. Hence it is possible to periodically reset the output voltage of the DC voltage detector 101 at the predetermined time interval.

The controller 102 calculates the amount of change in output voltage measured at the predetermined time interval, and sequentially integrates the amounts of change, to calculate the amount of displacement of the piezoelectric sensor 10. It should be noted that a detailed method for calculating the amount of displacement by means of the controller 102 will be described later.

Figure 2:
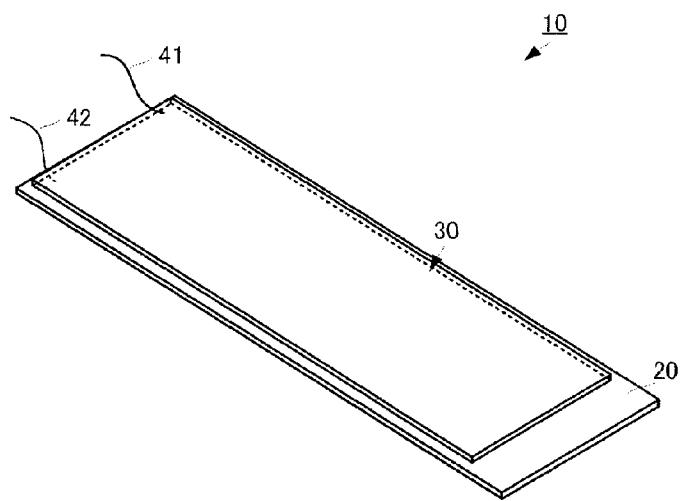
FIG. 2 is an external perspective view of a piezoelectric sensor 10 in the first embodiment of the present invention.
Figure 3:
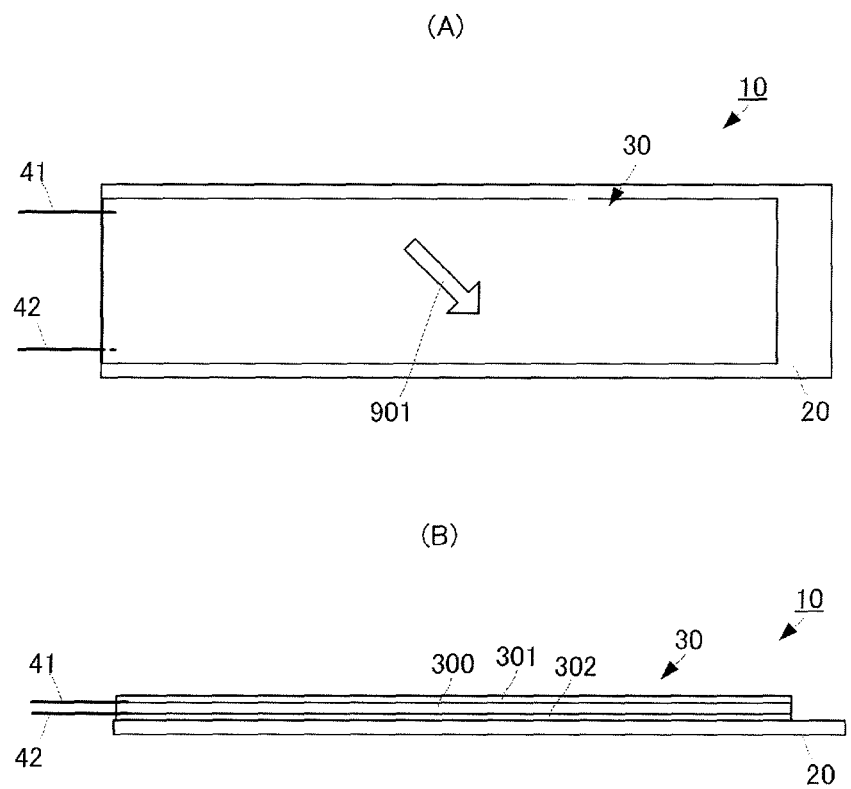
FIGS. 3(A) and 3(B) are a plan view and a side view of the piezoelectric sensor 10.

The piezoelectric sensor 10 of the displacement detection device 100 as thus configured has a configuration shown below. FIG. 2 is an external perspective view of the piezoelectric sensor 10 of the present embodiment. FIG. 3(A) is a plan view of the piezoelectric sensor 10, and FIG. 3(B) is its side view. The side view shown in FIGS. 3(B) is a side view seen such that a longer direction of the piezoelectric sensor 10 is a lateral direction of the drawing (the end surface of a shorter direction is seen).

The piezoelectric sensor 10 is provided with a tabular elastic body 20 and a flat membrane type piezoelectric element 30. The elastic body 20 has a predetermined thickness, and is made up of a rectangular shape having a longer direction that is longer in one direction and a shorter direction that is shorter in a direction orthogonal to the one direction, in a plan view. The elastic body 20 is formed of a polymer with relatively high strength, such as polyethylene-telephthalate (PET) or an acrylic resin (PMMA). In this case, a thickness of the elastic body 20 may be set to the order of 0.5 mm, for example. It is to be noted that the elastic body 20 may only be one at least having higher intensity than intensity of a piezoelectric sheet 300 constituting the piezoelectric element 30.

The piezoelectric element 30 is provided with the piezoelectric sheet 300 made up of a similar rectangular shape to that of the elastic body 20. The piezoelectric sheet 300 is formed of poly-L-lactic acid (hereinafter referred to as PLLA).

A detection electrode 301 is formed substantially over a first principal surface of the piezoelectric sheet 300. A detection electrode 302 is formed substantially over a second principal surface of the piezoelectric sheet 300. For the detection electrodes 301, 302, it is preferable to use either an organic electrode mainly composed of ITO, ZnO or polythiophene or an organic electrode mainly composed of polyaniline. By use of these materials, the detection electrodes 301, 302 become ones with high translucency (the same meaning as transparent ones). It is thereby possible to realize the piezoelectric sensor 10 with high translucency.

Further, when either the organic electrode mainly composed polythiophene or the organic electrode mainly composed of polyaniline is used for the detection electrodes 301, 302, the electrodes are hardly damaged due to bending while having translucency, and are thus more preferable. Moreover, when not needing to have translucency, the detection electrodes 301, 302 may be formed of a metal coated film formed by vaporization or plating or a printed electrode film formed by silver pasting. In particular, an aluminum vaporization coated film can be formed at low cost and is thus preferable.

The detection electrode 301 is connected with an external connection terminal 41. The detection electrode 302 is connected with an external connection terminal 42.

PLLA used for the piezoelectric sheet 300 of the piezoelectric sensor 10 as thus configured is a chiral polymer, and its main chain has a helical structure. This PLLA sheet is uniaxially stretched, and when molecules are oriented, the sheet has piezoelectricity. The uniaxially stretched PLLA has a very high piezoelectric constant, in polymers.

It is to be noted that a stretching multiplying factor is preferably the order of three to eight times. By performing thermal treatment after stretching, crystallization of completely stretched crystals of polylactic acid is promoted, to improve the piezoelectric constant. It should be noted that in the case of biaxial stretching, stretching multiplying factors of the respective axes are made different, and it is thereby possible to obtain a similar effect to that of uniaxial stretching. For example, when one direction is taken as an X-axis and eight-time stretching is performed in that direction while two-time stretching is performed in a Y-axis direction orthogonal to the X-axis direction, it is possible to obtain a similar effect concerning the piezoelectric constant to that in a case where about four-time stretching is performed in the X-axis direction. Since the simply uniaxially stretched film is apt to tear along the stretching axis direction, by performing the biaxially stretching as described above, the strength can be increased to some extent.

Further, PLLA generates piezoelectricity just by stretching, and it does not need to perform polling processing like other polymers such as PVDF or piezoelectric ceramics. That is, the piezoelectricity of PLLA not belonging to ferroelectrics is not expressed by polarization of ions like ferroelectrics such as PVDF and PZT, but is derived from the helical structure as the characteristic structure of the molecules. For this reason, pyroelectricity which is generated in other ferroelectric piezoelectric substances is not generated in PLLA. Further, a piezoelectric constant of PVDF or the like is seem to vary with time and may significantly decrease in some cases, whereas the piezoelectric constant of PLLA is extremely stable with time.

As thus described, using PLLA prevents an influence by the pyroelectricity. Accordingly, at the time of detecting displacement, an output voltage in accordance only with an amount of displacement can be obtained without depending on a temperature of a place of detection. Further, since PLLA is a polymer and has flexibility, it is not damaged due to large displacement, like piezoelectric ceramics. It is thus possible to reliably detect an amount of displacement even when the amount of displacement is large.

Further, since a dielectric constant of PLLA is about 2.5 which is very low, when d is a piezoelectric constant and $\epsilon^T$ is a dielectric constant, a piezoelectric output constant (=piezoelectric g constant, $g=d/\epsilon^T$) becomes a large value. Therefore, the use of the PLLA sheet leads to realization of a sensor having very high sensitivity and capable of obtaining a high output voltage with respect to displacement.

Further, the piezoelectricity of PLLA has anisotropy. Then, due to the effect of $d_{14}$ of PLLA, a direction in which the piezoelectric sheet made of PLLA is stretched most is a direction at 45° counterclockwise with respect to the uniaxially stretching direction, and a direction in which the piezoelectric sheet is stretched least is a direction at −45° counterclockwise with respect to the uniaxially stretching direction.

Therefore, the piezoelectric sheet is cut out, taking the direction at 45° with respect to the uniaxially stretching direction as a longer direction. It is thereby possible to form the foregoing piezoelectric sheet 300 in the state of having the highest sensitivity to stretching.

As thus described, the piezoelectric sheet 300 of the present embodiment is formed such that the uniaxially stretching direction forms the angle of 45° with respect to the longer direction. The piezoelectric element 30 obtained by forming the foregoing detection electrodes 301, 302 on both surfaces of the piezoelectric sheet 300 is attached to a first principal surface of the elastic body 20 by a translucent adhesive, not shown.

It is to be noted the angle is not restricted to accurate 45°, but may be substantially 45°. Substantially 45° refers to an angle including the order of 45°±10°, for example. This angle is a design matter which should be appropriately decided in accordance with a total design, such as bending detection accuracy, based on uses of the displacement sensor.

Figure 7:
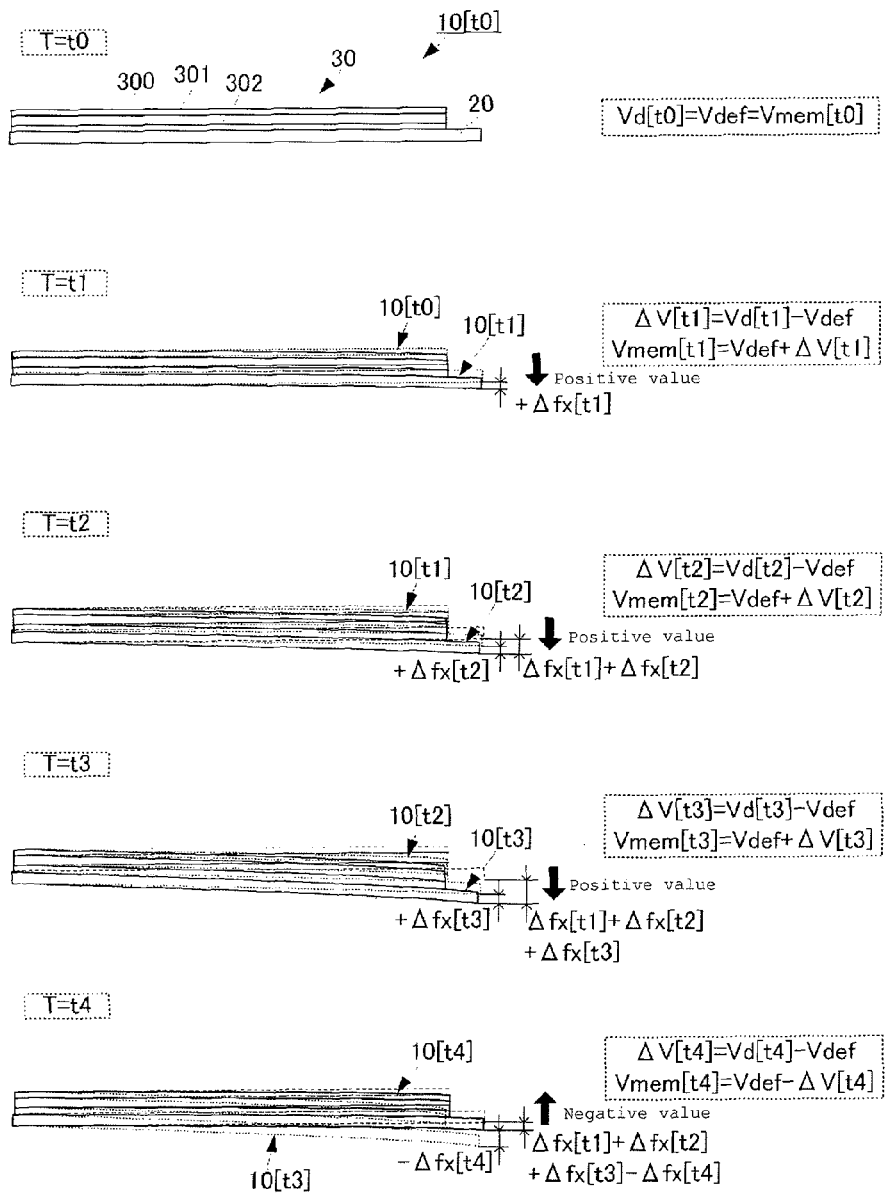
FIG. 7 is a view for explaining a measurement concept according to the first embodiment of the present invention.

The piezoelectric sensor 10 made up of such a shape can detect bending (warping) along the longer direction which forms 45° with respect to the uniaxially stretching direction, as shown in FIG. 7 described later.

When bending displacement is 0, namely when force which causes bending is not applied from the outside to the piezoelectric sensor 10, the principal surface of the elastic body 20 comes into a flat state in a side view. In this case, the piezoelectric element 30 is not stretched. For this reason, charge due to displacement is not generated in the piezoelectric sheet 300. Hence the output voltage remains unchanged.

When the bending displacement is a predetermined value, namely when force which causes bending is applied from the outside to the piezoelectric sensor 10, the principal surface of the elastic body 20 comes into a curved state along the longer direction. In this case, the piezoelectric sheet 300 is stretched along the longer direction in accordance with an amount of bending. Thereby, charge is generated in the piezoelectric sheet 300, and a voltage is generated between the detection electrodes 301, 302 with the piezoelectric sheet 300 placed therebetween. Hence the output voltage changes. Detecting an amount of the change in output voltage allows detection of stretching of the piezoelectric element 30, namely the amount of bending of the displacement sensor 10.

Figure 4:
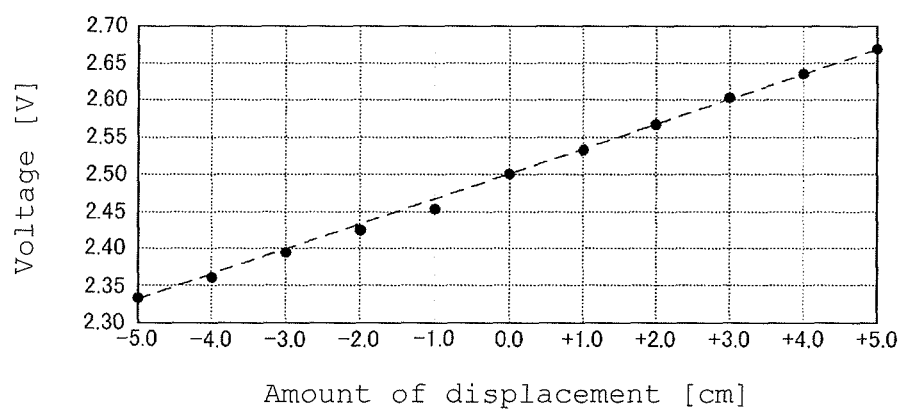
FIG. 4 is a diagram showing one example of the relation between an amount of displacement and an output voltage value by means of a piezoelectric sensor using PLLA.

Then, when the piezoelectric sheet 300 of PLLA is used, the amount of displacement and the output voltage become linear. FIG. 4 is a diagram showing one example of the relation between the amount of displacement and the output voltage value by means of the piezoelectric sensor using PLLA. As shown in FIG. 4, using the piezoelectric sheet 300 of PLLA leads to a linear change in output voltage in accordance with the amount of displacement. It is thereby possible to easily calculate the amount of displacement from the amount of change in output voltage. Further, with the amount of displacement and the output voltage having the linear relation, even when a method shown below for periodically resetting the output voltage is used, it is possible to accurately calculate the amount of displacement in accordance with the amount of change in output voltage. That is, in the case of nonlinearity, the amount of change in output voltage at the time of the state changing from the reference state to the first displacement state differs from the amount of change in output voltage at the time of the state changing from the first displacement state to the second displacement state, even when the amount of displacement is the same. However, in the case of linearity, since the amount of change in output voltage is uniquely decided in accordance with the amount of displacement, it is possible to use the periodically resetting method shown below.

Figure 5:
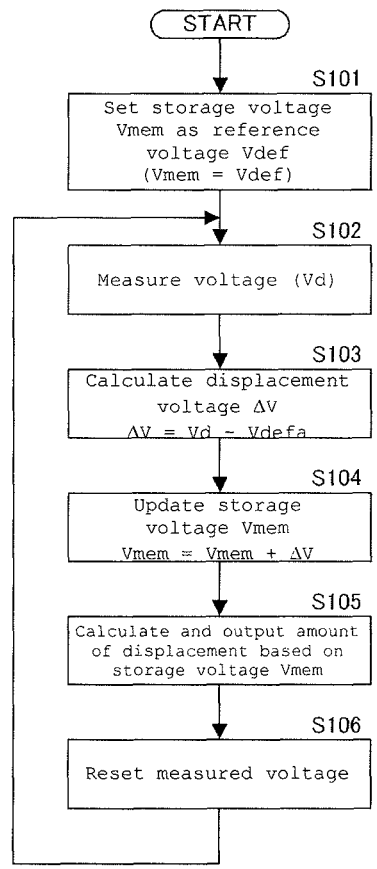
FIG. 5 is a flowchart for an amount-of-displacement detection method according to the first embodiment of the present invention.
Figure 6:
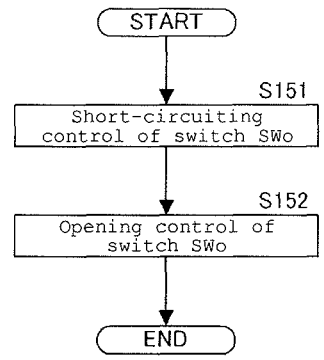
FIG. 6 is a flowchart for measured voltage reset processing.

Next, the displacement detection method using the displacement detection device 100 as thus configured will be more specifically described with reference to the drawings. FIG. 5 is a flowchart for an amount-of-displacement detection method according to the first embodiment of the present invention. FIG. 6 is a flowchart for measured voltage reset processing.

The controller 102 executes processing shown below while storing a storage voltage Vrem in accordance with a sequentially measured output voltage into a storage portion made up of a semiconductor memory or a magnetic medium.

First, as initial setting for detecting an amount of displacement, the controller 102 sets the storage voltage Vrem as a reference voltage Vdef, and stores the reference voltage Vdef (S101). A value of the reference voltage is made the same as a value of the output voltage of the piezoelectric sensor 10 in an initial state. At this time, the storage voltage Vrem is the reference voltage Vdef (Vrem=Vdef).

Next, the controller 102 starts measurement of the output voltage. The controller 102 measures an output voltage (Vd) at a predetermined timing (S102). The controller 102 calculates a displacement voltage ΔV as a difference value between the storage voltage Vrem stored in the storage portion and the output voltage Vd measured this time (S103).

The controller 102 adds the displacement voltage ΔV to the storage voltage Vrem, to update the storage voltage Vrem (S104). That is, controller 102 executes an operation of Vrem=Vrem+ΔV.

The controller 102 calculates an amount of displacement based on the updated storage voltage Vrem, and outputs the calculated amount of displacement (S105). The relation between the amount of displacement and the storage voltage Vrem is, for example, previously set in the form of a table in the storage portion, and upon updating of the storage voltage Vrem, the controller 102 calculates the amount of displacement with reference to the table. Further, the controller 102 previously stores a function of the amount of displacement and the value of the storage voltage Vrem, and upon updating of the storage voltage Vrem, the controller 102 substitutes it for the function, to calculate the amount of displacement.

The controller 102 resets the measured voltage after measuring the output voltage this time (S106). By this processing, the output voltage is initialized, to be set as the reference voltage. Specifically, after measuring the output voltage Vd, the controller 102 makes control of short-circuiting the switch SWo just for predetermined time, thereby allowing the detection electrodes 301, 302 to have electrical continuity via the resistor Ro (S151). Hence charge remaining in the piezoelectric sensor 10 is released, thereby initializing the output voltage. The controller 102 then makes control of opening the switch SWo again (S152). It is thereby possible to measure the output voltage Vd at the next measurement timing.

Subsequently, the controller 102 repeatedly executes measurement of the output voltage Vd, updating of the storage voltage Vrem, calculation of the amount of displacement and resetting of the measured voltage.

Since the measured voltage is reset at the predetermined time interval by executing the processing as above, the output voltage obtained in the DC voltage detector 101 is hardly influenced by voltage reduction due to self-discharge of the piezoelectric sensor 10. Further, the output voltage Vd obtained at each measurement timing changes by an amount of change in voltage according to the amount of displacement of the piezoelectric sensor 10 from the immediately previous measurement timing to the current measurement timing. Therefore, integrating the amounts of change in voltage allows accurate calculation of an overall amount of displacement obtained by one bending operation of the piezoelectric sensor 10.

Figure 8:
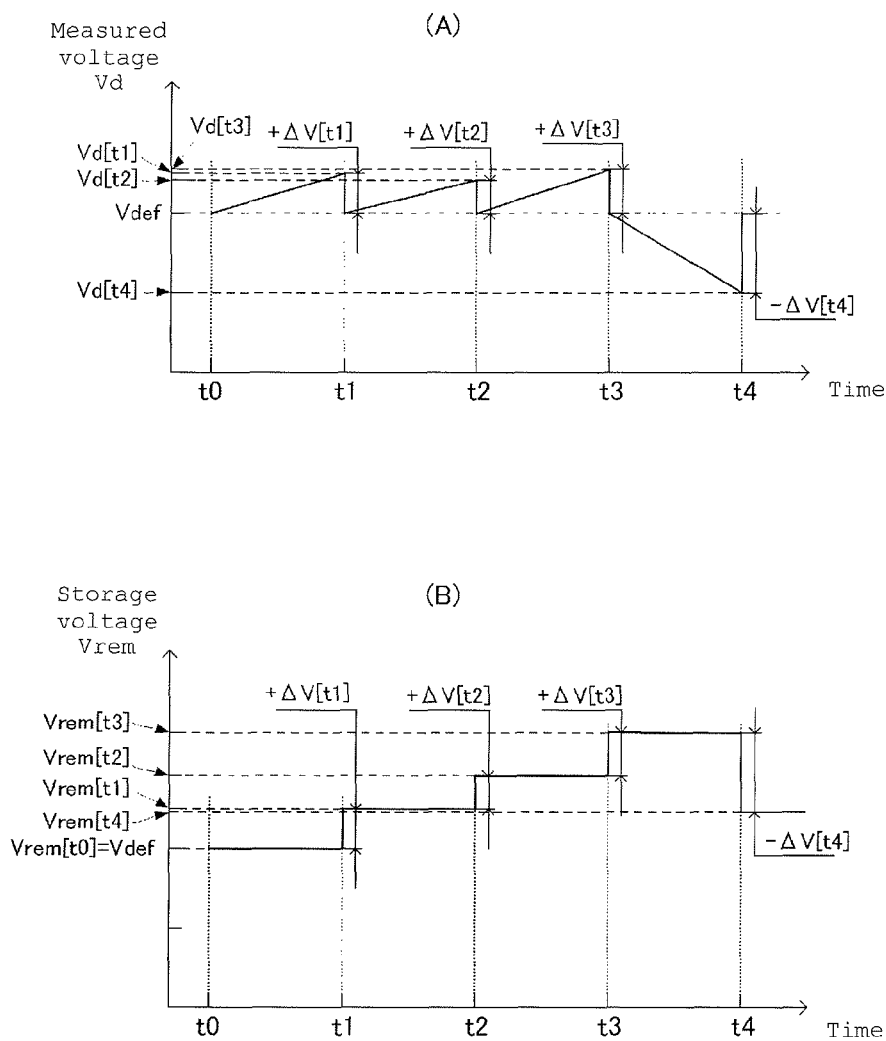
FIGS. 8(A) and 8(B) are graphs for showing time waveform examples of a measured voltage and a storage voltage.

Next, a specific calculation example for the amount of displacement will be described with reference to the drawings. FIG. 7 is a view for explaining a measurement concept. FIG. 8(A) is a graph showing a time waveform of the measured voltage (output voltage) Vd, and FIG. 8(B) is a graph showing a time waveform example of the storage voltage Vrem.

A time T=t0 is taken as the initial state. When T=t0, the piezoelectric sensor 10 (10[t0]) is in a flat state, and bending stress is not being applied from the outside. Then, one end of the piezoelectric sensor 10 in the longer direction is fixed. At this time point, each circuit element value of the displacement detection device 100 and the applied voltage are set such that the output voltage (measured voltage) Vd[t0] is obtained in the DC voltage detector 101. The controller 102 takes this initial voltage Vd[t0] as the reference voltage Vdef and sets it as the initial value Vrem[t0] of the storage voltage Vrem.

Next, when the bending stress is continuously applied to the piezoelectric sensor 10, the piezoelectric sensor 10 is stretched along the longer direction as shown in FIG. 7, and the measured voltage increases in accordance with stretching as shown in FIG. 8(A).

Then at a time point of a time T=t1, as shown in FIG. 7, the piezoelectric sensor 10[t1] is displaced by Δfx[t1] from the piezoelectric sensor 10[t0] at the time point of the time T=t0. At this time, an output voltage Vd[t1] (>Vdef) is obtained. The controller 102 subtracts the reference voltage Vdef (=Vd[t0]) from the output voltage Vd[t1], to calculate a displacement voltage AΔ[t1]. The controller 102 adds the displacement voltage ΔV[t1] to the storage voltage Vrem[t0], thereby updating and storing the obtained voltage as a storage voltage Vrem[t1] (=Vrem[t0]+ΔV[t1]). Accordingly, as shown in FIG. 8(B), the storage voltage Vrem[t1] at the time t=t1 increases from the storage voltage Vrem[t0] at the time T=t0 just by the displacement voltage ΔV[t1].

By performing such processing, at the time T=t1, the storage voltage increases from Vrem[t0] to Vrem[t1] just by the amount of change in voltage in accordance with the amount of displacement Δfx[t1] of the piezoelectric sensor 10 from the time T=t0 to the time T=t1. Therefore, by referring to the storage voltage Vrem[t1], the controller 102 can detect the amount of displacement Δfx[t1].

When the output voltage is measured in such a manner, the controller 102 temporarily short-circuits the detection electrodes 301, 302 of the piezoelectric sensor 10. Thereby, the output voltage is reset to the reference voltage Vdef.

Subsequently, when the bending stress is continuously applied to the piezoelectric sensor 10, the piezoelectric sensor 10 is further stretched along the longer direction as shown in FIG. 7, and the measured voltage increases again from the reference voltage Vdef in accordance with an amount of this stretching as shown in FIG. 8(A).

Then at a time point of a time T=t2, as shown in FIG. 7, the piezoelectric sensor 10[t2] is displaced by Δfx[t2] from the piezoelectric sensor 10[t1] at the time point of the time T=t1. At this time, an output voltage Vd[t2] (>Vdef) is obtained.

The controller 102 subtracts the reference voltage Vdef from the output voltage Vd[t2], to calculate a displacement voltage ΔV[t2]. The controller 102 adds the displacement voltage ΔV[t2] to the storage voltage Vrem[t1], to update and store the obtained voltage as a storage voltage Vrem[t2] (=Vrem[t1]+ΔV[t2]). Accordingly, as shown in FIG. 8(B), the storage voltage Vrem[t2] at the time t=t2 increases from the storage voltage Vrem[t1] at the time T=t1 just by the displacement voltage ΔV[t2].

By performing such processing, at the time T=t2, the storage voltage increases from Vrem[t1] to Vrem[t2] just by the amount of change in voltage in accordance with the amount of displacement Δfx[t2] of the piezoelectric sensor 10 from the time T=t1 to the time T=t2. Therefore, by referring to the storage voltage Vrem[t2], the controller 102 can detect the amount of displacement Δfx[t2] from the time T=t1 to the time T=t2.

Further, the storage voltage Vrem[t2] at the time T=t2 has increased with respect to the initial storage voltage Vrem[t0] just by a value obtained by adding the displacement voltage ΔV[t1] and the displacement voltage ΔV[t2]. Therefore, by referring to the storage voltage Vrem[t2], the controller 102 can detect the amount of displacement Δfx[t1]+Δfx[t2] from the time T=t0 to the time T=t2. That is, sequentially integrating the displacement voltages allows detection of the amount of displacement of the piezoelectric sensor 10 at the time T=t2 with respect to the time T=t0.

When the output voltage is measured in such a manner, the controller 102 temporarily short-circuits the detection electrodes 301, 302 of the piezoelectric sensor 10. Thereby, the output voltage is reset again as the reference voltage Vdef.

Still subsequently, when the bending stress is continuously applied to the piezoelectric sensor 10, the piezoelectric sensor 10 is further stretched along the longer direction as shown in FIG. 7, and the measured voltage increases again from the reference voltage Vdef in accordance with an amount of this stretching as shown in FIG. 8(A).

Then at a time point of a time T=t3, as shown in FIG. 7, the piezoelectric sensor 10[t3] is displaced by Δfx[t3] from the piezoelectric sensor 10[t2] at the time point of the time T=t2. At this time, an output voltage Vd[t3] (>Vdef) is obtained.

The controller 102 subtracts the reference voltage Vdef from the output voltage Vd[t3], to calculate a displacement voltage ΔV[t3]. The controller 102 adds the displacement voltage ΔV[t3] to the storage voltage Vrem[t2], to update and store the obtained voltage as a storage voltage Vrem[t3] (=Vrem[t2]+ΔV[t3]). Accordingly, as shown in FIG. 8(B), the storage voltage Vrem[t3] at the time t=t3 increases from the storage voltage Vrem[t2] at the time T=t2 just by the displacement voltage ΔV[t3].

By performing such processing, at the time T=t3, the storage voltage increases from Vrem[t2] to Vrem[t3] just by the amount of change in voltage in accordance with the amount of displacement Δfx[t3] of the piezoelectric sensor 10 from the time T=t2 to the time T=t3. Therefore, by referring to the storage voltage Vrem[t3], the controller 102 can detect the amount of displacement Δfx[t3] from the time T=t2 to the time T=t3.

Further, the storage voltage Vrem[t3] at the time T=t3 has increased with respect to the initial storage voltage Vrem[t0] just by a value obtained by adding the displacement voltage ΔV[t1], the displacement voltage ΔV[t2] and the displacement voltage ΔV[t3]. Therefore, by referring to the storage voltage Vrem[t3], the controller 102 can detect the amount of displacement ≠fx[t1]+Δfx[t2]+Δfx[t3] from the time T=t0 to the time T=t3. That is, sequentially integrating the displacement voltages allows detection of the amount of displacement of the piezoelectric sensor 10 at the time T=t3 with respect to the time T=t0.

When the output voltage is measured in such a manner, the controller 102 temporarily short-circuits the detection electrodes 301, 302 of the piezoelectric sensor 10. Thereby, the output voltage is reset again as the reference voltage Vdef.

Next, when the bending stress to the piezoelectric sensor 10 is alleviated and the stretching of the piezoelectric sensor 10 in the longer direction is returned (the piezoelectric sensor 10 shrinks) from the time T=t3 as shown in FIG. 7, the measured voltage decreases from the reference voltage Vdef in accordance with an amount of this shrinkage as shown in FIG. 8(A).

Then at a time point of a time T=t4, as shown in FIG. 7, the piezoelectric sensor 10[t4] is displaced by Δfx[t4] from the piezoelectric sensor 10[t3] at the time point of the time T=t3. It should be noted that, with Δfx[t4] being a negative value, it will hereinafter be described as −Δfx[t4]. At this time, an output voltage Vd[t4] (<Vdef) is obtained.

The controller 102 subtracts the reference voltage Vdef from the output voltage Vd[t4], to calculate a displacement voltage ΔV[t4]. It should be noted that, with ΔV[t4] also being a negative value, it will hereinafter be described as −ΔV[t4]. The controller 102 adds the displacement voltage −ΔV[t4] to the storage voltage Vrem[t3], to update and store the obtained voltage as a storage voltage Vrem[t4] (=Vrem[t3]−ΔV[t4]). Accordingly, as shown in FIG. 8(B), the storage voltage Vrem[t4] at the time t=t4 decreases from the storage voltage Vrem[t3] at the time T=t3 just by the displacement voltage −ΔV[t3].

By performing such processing, at the time T=t4, the storage voltage decreases from Vrem[t3] to Vrem[t4] just by the amount of change in voltage in accordance with the amount of displacement −Δfx[t4] of the piezoelectric sensor 10 from the time T=t3 to the time T=t4. Therefore, by referring to the storage voltage Vrem[t4], the controller 102 can detect the amount of displacement −Δfx[t4] from the time T=t3 to the time T=t4.

Further, the storage voltage Vrem[t4] at the time T=t4 is a value obtained by adding the displacement voltage ΔV[t1], the displacement voltage ΔV[t2] and the displacement voltage ΔV[t3] to the initial storage voltage Vrem[t0], and then subtracting therefrom the displacement voltage −ΔV[t4]. Therefore, by referring to the storage voltage Vrem[t4], the controller 102 can detect the amount of displacement Δfx[t1]+Δfx[t2]+Δfx[t3]=ΔV[t4] from the time T=t0 to the time T=t4. That is, sequentially integrating the displacement voltages allows detection of the amount of displacement of the piezoelectric sensor 10 at the time T=t4 with respect to the time T=t0.

When the output voltage is measured in such a manner, the controller 102 temporarily short-circuits the detection electrodes 301, 302 of the piezoelectric sensor 10. Thereby the output voltage is reset again as the reference voltage Vdef.

As above, using the displacement detection method of the present embodiment allows accurate detection of the amount of displacement of the piezoelectric sensor 10.

Figure 9:
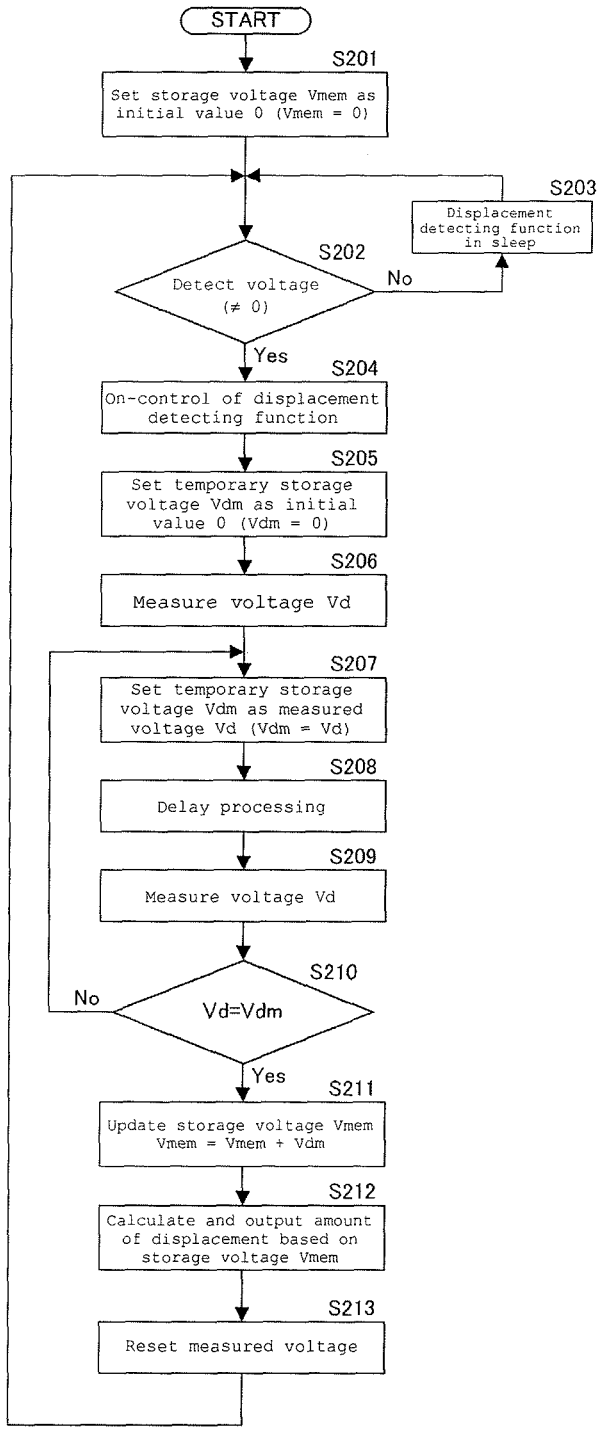
FIG. 9 is a flowchart for an amount-of-displacement detection method according to a second embodiment of the present invention.

Next, a displacement detection device and a displacement detection method according to a second embodiment will be described with reference to the drawing. The displacement detection device of the present embodiment is different from the displacement detection device shown in the first embodiment in that the controller 102 makes control of a power supply of the displacement detection device, such as the operational amplifier OP. FIG. 9 is a flowchart for an amount-of-displacement detection method according to the second embodiment of the present invention.

First, as initial setting for detecting an amount of displacement, the controller 102 sets the storage voltage Vrem as a reference voltage 0[V], and stores the reference voltage 0[V] (S201). A value of the reference voltage is made the same as a value of the output voltage of the piezoelectric sensor 10 in an initial state. That is, at this point, the output voltage is 0[V].

Next, the controller 102 observes a voltage generated in the piezoelectric sensor 10, and when detecting that the voltage is not 0[V] (S202: Yes), the controller 102 activates the displacement detection device 100 (S204). Here, the controller 102 holds a sleep state of the displacement detection device 100 when the voltage is 0[V] (S202: No→S203). The sleep state indicates a state where displacement detection processing is not executed. It should be noted that, when a circuit is provided where the controller 102 can directly observe a voltage generated in the piezoelectric sensor 10, there may be made control such as stopping or reduction of an applied voltage of the operational amplifier, as the sleep state.

When the displacement detection device 100 is activated and the displacement detection device is on-controlled, the controller 102 sets a temporary storage voltage Vdm as an initial value 0[V] (S205).

Next, the controller 102 starts measurement of the output voltage. Further, the controller 102 measures an output voltage (Vd) at a predetermined timing after the lapse of predetermined time from the timing of setting the temporary storage voltage Vdm as the initial value 0[V] (S206). The controller 102 sets the temporary storage voltage Vdm stored in the storage portion as the output voltage Vd measured this time (S207).

After setting a predetermined delay time (S208), the controller 102 measures the output voltage (Vd) (S209). The delay time set here is set in accordance with a time constant of the piezoelectric sensor 10 and a response speed of its output voltage to bending such that the delay time is shorter than time for which the output voltage is held when an amount of bending remains unchanged and the delay time is longer than time for which the output voltage starts to change in accordance with an amount of change in bending when the amount of bending changes.

The controller 102 determines whether the output voltage Vd after the lapse of the delay time (output voltage Vd in Step S209) substantially agrees with the temporary storage voltage Vdm before the delay time (temporary storage voltage Vdm in Step S207) (S210). Here, the determination that the voltages substantially agree with each other is adopted by falling of the output voltage Vd after the lapse of the delay time within a voltage error range previously set in accordance with voltage detection accuracy with respect to the temporary storage voltage Vdm.

When determining that the voltages do not substantially agree with each other (S210: No), the controller 102 repeatedly executes processing of measuring the output voltage Vd while updating the temporary storage voltage Vdm, shown in the foregoing steps S207, S208, S209. This is a state where the bending stress is continuously applied to the piezoelectric sensor 10, and in this case, the amount of displacement is not calculated.

When determining that the voltages substantially agree with each other (S210: Yes), the controller 102 updates the storage voltage Vrem with the temporary storage voltage Vdm. That is, the controller 102 executes an operation of Vrem=Vrem+Vdem (S211). This is a state where displacement of the piezoelectric sensor 10 due to the bending stress has been stopped, and in this case, the amount of displacement is calculated.

Based on the updated storage voltage Vrem, the controller 102 calculates and outputs the amount of displacement in a similar manner to the method shown in the first embodiment (S212).

The controller 102 resets the measured voltage after measuring the output voltage this time (S213). By this processing, the output voltage is initialized, to be set as the reference voltage. It is thereby possible to measure the output voltage Vd at the next measurement timing.

Subsequently, the controller 102 repeats the foregoing processing, to allow subsequent detection of the amount of displacement of the piezoelectric sensor 10.

Using the configuration and the method as thus described brings the device into the sleep state during a period when displacement of the piezoelectric sensor 10 does not occur, thereby allowing reduction in power consumption.

Figure 10:
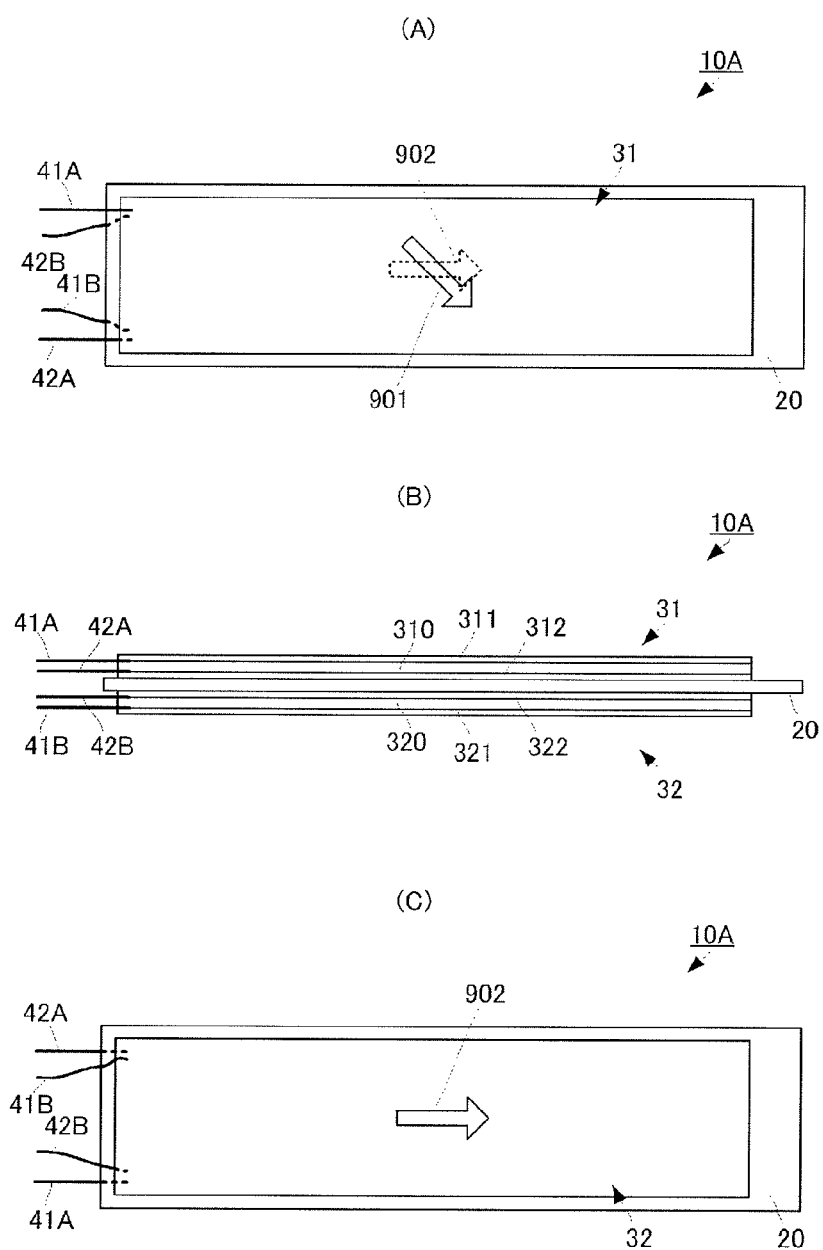
FIGS. 10(A) to 10(C) are a plan view, a side view and a rear view of a piezoelectric sensor 10 with the other configuration.

It is to be noted that, although each of the foregoing embodiments has indicated the example of using the piezoelectric sensor 10 for detecting bending, it is also applicable to the case of using a piezoelectric sensor for detecting twisting. In addition, twisting represents a state where, in the case of using the foregoing piezoelectric sensor being longer in one side, one end in the shorter direction is displaced in an upward direction with respect to the principal surface and the other end is displaced in a downward direction. Further, it is also applicable to the case of using a piezoelectric sensor for simultaneously detecting bending and twisting. FIG. 10 is a trihedral view of a piezoelectric sensor 10A for detecting bending and twisting. FIG. 10(A) is a plan view of the piezoelectric sensor 10A, FIG. 10(B) is its side view, and FIG. 10(C) is its rear view.

The piezoelectric sensor 10A shown in FIG. 10 includes the elastic body 20 and piezoelectric elements 31, 32. The elastic body 20 is the same as in the first embodiment, and its description will be omitted.

The piezoelectric element 31 is attached to the first principal surface of the elastic body 20. The piezoelectric element 31 is provided with a rectangular piezoelectric sheet 310. The piezoelectric sheet 310 is formed such that the uniaxially stretching direction and the longer direction form 45° as is the piezoelectric sheet 300 of the first embodiment. Detection electrodes 311, 312 are respectively formed substantially over both principal surfaces of the piezoelectric sheet 310. The detection electrode 311 is connected with an external connection terminal 41A, and the electrode 312 is connected with an external connection terminal 42A.

The piezoelectric element 32 is attached to the second principal surface of the elastic body 20. The second principal surface is opposed to the first principal surface. The piezoelectric element 32 is provided with a rectangular piezoelectric sheet 320. The piezoelectric sheet 320 is formed such that the uniaxially stretching direction and the longer direction are parallel to each other (formed angle=0°).

It is to be noted the angle is not restricted to accurate 0°, but may be substantially 0°. Substantially 0° refers to an angle including the order of 0°±10°, for example. This angle is a design matter which should be appropriately decided in accordance with a total design, such as bending detection accuracy, based on uses of the displacement sensor.

Detection electrodes 321, 322 are respectively formed substantially over both principal surfaces of the piezoelectric sheet 320. The detection electrode 321 is connected with an external connection terminal 41B, and the electrode 322 is connected with an external connection terminal 42B.

The piezoelectric element 31 and the piezoelectric element 32 are attached to the elastic body 20 such that the uniaxially stretching direction of the piezoelectric sheet 310 and the uniaxially stretching direction of the piezoelectric sheet 320 form 45°, and the longer direction (=uniaxially stretching direction) of the piezoelectric sheet 320 is parallel to the longer direction of the elastic body 20.

With such a configuration, it is possible to simultaneously detect bending and twisting by means of the piezoelectric sensor 10A. Then in such a case, the constitutional elements other than the piezoelectric sensor which constitute the foregoing displacement detection device may be provided with respect to each of the piezoelectric elements 31, 32. The controller may individually control detection of displacement with respect to each of the piezoelectric elements 31, 32.

Further, although the example of using the highly translucent (transparent) piezoelectric sensor has been shown in the foregoing description, one having low translucency may be used. In this case, the degree of freedom in selecting each constitutional element of the piezoelectric sensor is improved. However, the material for the piezoelectric sheet is preferably polylactic acid such as PLLA.

Further, in the foregoing description, the example of the case has been described where the principal surface of the flat membrane type piezoelectric sensor (piezoelectric sheet) is flat as the initial reference state. However, even when the piezoelectric sheet is curved or the like from the initial reference state, as in the case of it being pasted along the circumferential surface of a shaft of a cylindrical shape, it is possible to apply the configuration of the displacement detection device and the displacement detection method described above.

Further, in the foregoing description, the case has been shown where one piezoelectric sensor is used for detecting displacement in one direction. However, a plurality of piezoelectric sensors may be laminated such that the flat surfaces are superimposed. Thereby, adding outputs of the respective piezoelectric sensors allows a higher output voltage to be obtained even with the same amount of displacement. That is, it is possible to improve output-voltage sensitivity with respect to displacement.

Moreover, in the foregoing description, making the elastic body conductive allows the elastic body to also serve as the detection electrode on the elastic body side of the piezoelectric element. This can omit the detection electrode on the elastic body side of the piezoelectric element, thereby simplifying the configuration of the piezoelectric sensor. Hence it is also possible to simplify the configuration of the displacement detection device.

DESCRIPTION OF REFERENCE SYMBOLS

100: displacement detection device
101: DC voltage detector
102: controller
10, 10A: piezoelectric sensor
Co: capacitor
SWo: switch
OP: operational amplifier
Ro, R1, R2: resistor
VR: variable resistor
20: elastic body
30, 31, 32: piezoelectric element
300, 310, 320: piezoelectric sheet
301, 302, 311, 312, 321, 322: detection electrode
41, 42, 41A, 42A, 41B, 42B: external connection terminal

The invention claimed is:

1. A displacement detection device comprising:
a piezoelectric sensor including a piezoelectric substance and a pair of detection electrodes disposed on opposing surfaces of the piezoelectric substance;
a voltage detector configured to measure a voltage generated by the piezoelectric sensor in response to displacement of the piezoelectric substance;
a switch coupled between the pair of detection electrodes; and
a controller configured to open the switch for the voltage detector to measure the voltage generated by the piezoelectric sensor,
wherein the controller is coupled to the voltage detector to detect an output voltage from the voltage detector and further configured to short-circuit the switch for a predetermined period of time after detecting the output voltage, and
wherein the controller includes memory and is configured to:
calculate a displacement voltage as a difference from the output voltage and an initial value of a storage voltage in the memory, the initial value being a value of a reference voltage,
update the storage voltage by adding the displacement voltage to the storage voltage, and
calculate an amount of displacement of the piezoelectric sensor based on the updated storage voltage stored in the memory of the controller.

2. The displacement detection device according to claim 1, wherein the controller calculates the amount of displacement based on an integrated value of an amount of change in the calculated displacement voltage that is calculated immediately before the controller short-circuits the switch.

3. The displacement detection device according to claim 2, wherein the controller is further configured to integrate the amount of change sequentially from the initial value of the storage voltage in the memory.

4. The displacement detection device according to claim 3, wherein the controller is further configured to transition to a standby state upon detection that the storage voltage in the memory is not updated for predetermined time.

5. The displacement detection device according to claim 4, wherein the controller is further configured to:
set a temporary storage voltage as the initial value of the storage voltage,
compare the output voltage detected by the controller and the temporary storage voltage while the output voltage is output by the voltage detector during a temporary storage time that is based on a charge release time constant of the piezoelectric sensor,
update the temporary storage voltage with the output voltage output during the temporary storage time when the output voltage output during the temporary storage time and the temporary storage voltage are different from each other, and
set the output voltage output during the temporary storage time as the storage voltage in the memory when the output voltage output during the temporary storage time and the temporary storage voltage are substantially equal to each other.

6. The displacement detection device according to claim 1, further comprising a capacitor connected in parallel to the piezoelectric sensor.

7. The displacement detection device according to claim 1, wherein the piezoelectric substance is a flat membrane comprising polylactic acid subjected to stretching treatment at least in a uniaxial direction.

8. The displacement detection device according to claim 7, wherein the uniaxial direction is substantially ±45° with respect to a direction in which the piezoelectric substance is displaced.

9. The displacement detection device according to claim 8, wherein
a length of a first direction in the piezoelectric substance is larger than a length of a second direction orthogonal to the length of the first direction, and an angle formed by the first direction and the uniaxial direction is substantially ±45°.

10. The displacement detection device according to claim 8, wherein
a length of a first direction in the piezoelectric substance is larger than a length of a second direction orthogonal to the length of the first direction, and
an angle formed by the first direction and the uniaxial direction is either approximately 0° or approximately 90°.

11. The displacement detection device according to claim 8, wherein
the piezoelectric sensor further includes an additional piezoelectric substance and an additional pair of detection electrodes disposed on opposing surfaces of the additional piezoelectric substance, and also includes a tabular elastic body, each of the piezoelectric substance and the additional piezoelectric substance being disposed on opposing surfaces of the tabular elastic body,
a length of a first direction in the piezoelectric substances is larger than a length of a second direction orthogonal to the length of the first direction,
an angle formed by the first direction and the uniaxial direction in the piezoelectric substance is approximately ±45°, and
an angle formed by the first direction and the uniaxial direction in the additional piezoelectric substance is either approximately 0° or approximately 90°.

12. The displacement detection device according to claim 11, wherein the tabular elastic body includes a conductor on a surface thereof, and the conductor serves as one electrode of the pair of detection electrodes disposed on one of the opposing surfaces of the piezoelectric substance or the additional piezoelectric substance.

13. The displacement detection device according to claim 11, wherein the tabular elastic body and at least one of the pair of additional detection electrodes comprise transparent materials.

14. The displacement detection device according claim 1, wherein the piezoelectric substance is laminated with the detection electrode interposed therebetween.

15. The displacement detection device according claim 1, wherein the controller is configured to short-circuit the switch for a predetermined period of time immediately after the controller detects the output voltage output from the voltage detector.

16. The displacement detection device according claim 1, further comprising an operational amplifier coupled between the piezoelectric sensor and the voltage detector,
wherein the piezoelectric sensor is coupled to a non-inverting input terminal of the operational amplifier and the voltage detector is coupled to an output terminal of the operational amplifier, and
wherein the output terminal of the operational amplifier is further coupled to an inverting input terminal of the operational amplifier.

17. A displacement detection method for detecting an amount of displacement of a piezoelectric sensor from an output voltage of the piezoelectric sensor, the method comprising:
setting a storage voltage for displacement calculation as a reference voltage;
measuring an output voltage of the piezoelectric sensor at a predetermined interval of time to obtain a measured voltage;
calculating a displacement voltage as a difference between the measured voltage and the reference voltage;
resetting the measured voltage to the reference voltage after calculating the displacement voltage;
sequentially integrating the displacement voltages to the reference voltage while updating and storing the obtained voltage as the storage voltage; and
calculating the amount of displacement from the storage voltage.

18. The displacement detection method according to claim 17, further comprising transitioning to a standby state upon detection that the storage voltage remains to be the reference voltage for predetermined time.

19. The displacement detection method according to claim 18, further comprising:
setting a temporary storage voltage as an initial value upon detection of a different voltage from the reference voltage;
comparing the output voltage and the temporary storage voltage while detecting the output voltage for temporary storage time based on a charge release time constant of the piezoelectric sensor;
updating the temporary storage voltage with the output voltage when the output voltage and the temporary storage voltage are different from each other; and
setting the output voltage as the storage voltage when the output voltage and the temporary storage voltage are substantially equal to each other.

* * * * *